United States Patent
Huang et al.

(10) Patent No.: US 12,422,332 B2
(45) Date of Patent: Sep. 23, 2025

(54) PIPELINE SPANNING OR SETTLEMENT BENDING DETECTION DEVICE AND METHOD

(71) Applicant: Tianjin University, Tianjin (CN)

(72) Inventors: Xinjing Huang, Tianjin (CN); Jinshuo Ma, Tianjin (CN); Jinyu Ma, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 19/003,008

(22) Filed: Dec. 27, 2024

(65) Prior Publication Data
US 2025/0231078 A1    Jul. 17, 2025

(30) Foreign Application Priority Data

Jan. 17, 2024  (CN) .......................... 202410067245.X

(51) Int. Cl.
*G01M 5/00*    (2006.01)
(52) U.S. Cl.
CPC ........ *G01M 5/0025* (2013.01); *G01M 5/0075* (2013.01)
(58) Field of Classification Search
CPC .......................... G01M 5/0025; G01M 5/0075
See application file for complete search history.

(56) References Cited

U.S. PATENT DOCUMENTS

2023/0040501 A1*  2/2023  Straeussnigg ............ H04R 3/04

FOREIGN PATENT DOCUMENTS

| CN | 102444786 | | 5/2012 |
|---|---|---|---|
| CN | 106043312 | | 11/2015 |
| CN | 114151737 | | 3/2022 |
| CN | 114413183 | | 4/2022 |
| CN | 114413183 B | * | 9/2023 |
| WO | WO-2023182750 A1 | * | 9/2023 |

OTHER PUBLICATIONS

Machine translation of CN114413183 (Year: 2023).*
Machine translation of WO2023182750 A1 (Year: 2023).*
Search report (IP.com) (Year: 2025).*
Shili et al., "Tracking and Localization Technology of Spherical Pipeline Internal Detector", Nanotechnology and Precision Engineering, vol. 14 No. 2, Mar. 2016.
Zhou et al., "Tracing and localization method of spherical inner detector for pipelines based on active acoustics", Chinese Journal of Scientific Instrument, vol. 41 No. 8, Aug. 2020.

* cited by examiner

*Primary Examiner* — Christopher P McAndrew
*Assistant Examiner* — Sangkyung Lee
(74) *Attorney, Agent, or Firm* — Woodard, Emhardt, Henry, Reeves & Wagner, LLP

(57) ABSTRACT

Provided are a pipeline spanning or settlement bending detection device and method, relating to the field of pipeline curvature measurement technology, to solve the problem that the curvature of a pipeline made of a composite material cannot be detected using the related art. The device includes a watertight spherical shell and multiple detectors. For each detector, the detector is configured to acquire a non-magnetic signal fed back by the inner wall of a to-be-detected pipeline to determine the distance between the detector and the inner wall of the pipeline. The method includes that a microcontroller acquires a two-axis accelerometer signal and calculates pipeline curvature when non-magnetic signals reach the extremum.

9 Claims, 7 Drawing Sheets

PIPELINE SPANNING OR SETTLEMENT BENDING DETECTION DEVICE AND METHOD

CROSS-REFERENCE TO RELATED APPLICATION

The present application claims priority to Chinese Patent Application No. 202410067245.X, filed with the China National Intellectual Property Administration (CNIPA) on Jan. 17, 2024, the disclosure of which is incorporated herein by reference in its entirety.

TECHNICAL FIELD

The present invention relates to the field of pipeline curvature measurement technology, particularly a pipeline spanning or settlement bending detection device and method.

BACKGROUND

In recent years, the number of subsea pipelines has been increasing, playing a crucial role in subsea oil and gas transportation. The operational safety of subsea pipelines is of utmost importance. However, the marine environment is complex, and subsea pipelines face significant risks due to ocean pressure and seawater corrosion. The main risks include pipeline bending, pipeline brittle fracture, pipeline fatigue failure, and pipeline corrosion failure.

Due to factors such as ocean currents, ocean erosion, and seabed undulations, subsea pipelines are prone to spanning, leading to pipeline bending. When the bending reaches the pipeline fatigue limit, pipeline fractures easily occur. If leakage occurs, the leakage may cause severe marine environmental pollution and economic loss. Therefore, timely and accurate detection of the spanning curvature of subsea pipelines, that is, the pipeline bending angle, is crucial for maintaining the normal operation of subsea pipelines and protecting the marine ecological environment.

Currently, subsea pipeline spanning or settlement bending deformation detection methods include internal detection methods and external detection methods based on the remotely operated vehicle (ROV) and the autonomous underwater vehicle (AUV). External detection methods are highly limited due to the challenges posed by subsea pipeline bending deformation, difficulty in detection, high costs, long durations, and very limited detection accuracy. These methods have significant drawbacks. Internal detection methods combine the pipeline inspection gauge (PIG) with the strapdown inertial navigation system (SINS) to perform pipeline spanning or settlement bending deformation detection. Traditional internal detectors are widely used for pipeline inspection. However, due to their size limitations, traditional internal detectors pose a high risk of blockage, restricting their application. Similarly, the use of these methods to detect settlement bending caused by various factors in land pipelines faces the same blockage risk and also requires an efficient and convenient detection approach.

The spherical inner detector (SD) is small in size, can easily pass through a pipeline, and does not face positioning divergence. Patent with application No. 201810464000.5 entitled pipeline pitch angle measurement device and method and patent with application No. 202210277657.7 entitled subsea pipeline bending angle measurement method disclose a pipeline pitch angle measurement method based on electromagnetic effects and a pipeline curvature measurement method based on electromagnetic effects. However, these patents can be applied to only ferromagnetic steel pipes and metal steel pipes and cannot be used for detecting composite materials.

A pipeline leakage positioning method based on a spherical inner detector with application No. 202111603276.5 uses a balancing metal block to balance the spherical inner detector, ensuring that the average density of the spherical inner detector is greater than that of water such that the spherical inner detector can sink to the bottom of the pipeline during rolling. To improve the moment of inertia of the spherical inner detector along the normal direction of the equatorial surface, the rotary shaft that allows the spherical detector to roll stably inside the pipeline is along the normal direction of the equatorial surface and does not slide against the pipeline wall. The balancing metal block of this solution causes the spherical inner detector to generate significant noise while rolling inside the pipeline, resulting in inaccurate data acquisition.

SUMMARY

The present invention provides a pipeline spanning or settlement bending detection device and a method of using this device to solve the problem that the curvature of a pipeline made of a composite material cannot be detected using the related art.

To solve these problems, the present invention provides the following solutions:

A pipeline spanning or settlement bending detection device includes: a watertight spherical shell and multiple detectors.

The watertight spherical shell includes a circuit board, multiple battery holders, multiple electromagnetic coils, and two vibration-damping rings.

The circuit board is connected to the middle of the equatorial surface of the watertight spherical shell.

The multiple battery holders are arranged in a circumferential array and electrically connected to the circuit board.

The multiple electromagnetic coils are arranged in a circumferential array, spaced apart from the multiple battery holders, electrically connected to the circuit board, and configured to transmit detection data and charge batteries in the multiple battery holders.

The two vibration-damping rings are connected to outer walls on two sides of the equatorial surface of the watertight spherical shell.

The multiple detectors are circumferentially connected to the equator of the watertight spherical shell. For each detector, the detector is configured to acquire a non-magnetic signal fed back by the inner wall of a to-be-detected pipeline to determine the distance between the detector and the inner wall of the pipeline. The non-magnetic signal is an acoustic signal or an optical signal.

Further, the detector is an analog microphone, a digital microphone, or an optical proximity switch.

Further, metal rings are sleeved on the two sides of the equatorial surface of the watertight spherical shell, the vibration-damping rings are sleeved in the metal rings, and the metal rings are in a clearance fit with the watertight spherical shell.

A suspension frame is rotatably connected to the outer wall of the watertight spherical shell. The suspension frame includes a connecting rope connected to the suspension frame; a suspension ball connected to the connecting rope; two top rods symmetrically connected to the upper part of the suspension frame; and two magnets symmetrically connected to the lower part of the suspension frame.

The suspension ball floats in the liquid inside the pipeline and relies on buoyancy to pull the suspension frame such that the top rods are positioned at the upper part of the suspension frame and the magnets are positioned at the lower part of the suspension frame so that the top rods press upper parts of the metal rings and the magnets attract lower parts of the metal rings so that the vibration-damping rings on two sides of the plurality of detectors close to the inner wall of the pipeline move away from each other.

Further, a two-axis accelerometer is mounted inside the watertight spherical shell and configured to collect an acceleration signal generated when the watertight spherical shell rolls.

A pipeline spanning or settlement bending detection method using the pipeline spanning or settlement bending detection device includes that a microcontroller acquires non-magnetic signals collected by the multiple detectors and the acceleration signal collected by the two-axis accelerometer; and calculating pipeline curvature when the non-magnetic signals reach the extremum.

Calculating the pipeline curvature includes synchronizing the non-magnetic signals collected by the multiple detectors with the acceleration signal collected by the two-axis accelerometer; calculating the time difference between X-axis and Y-axis accelerometer component time measured by the two-axis accelerometer when the non-magnetic signals acquired by the multiple detectors reach the minimum value and X-axis and Y-axis accelerometer component extremum point or zero point time; determining whether the direction is uphill or downhill by judging whether the time difference is positive or negative; calculating the current pipeline curvature; and summing curvature values corresponding to the multiple detectors to obtain the current final curvature value.

Further, the non-magnetic signals are acoustic signals when the multiple detectors are analog microphones.

The analog microphones synchronously acquire the acoustic signals inside the pipeline.

When the analog microphone at the bottommost part of the equator of the watertight spherical shell acquires an acoustic signal that reaches the minimum intensity when in contact with the inner wall of the pipeline, the analog microphone at the topmost part of the equator of the watertight spherical shell acquires an acoustic signal that reaches the maximum intensity.

Rectified amplitude extraction circuits corresponding to the analog microphones amplify voltage signals output by the analog microphones and transmit the voltage signals to a synchronous analog-to-digital converter (ADC) module.

When the voltage signals reach the minimum value, the pipeline curvature is calculated.

Further, extracting rectified amplitudes includes S1: performing rectification by converting voltage amplitudes into absolute values by using a first operational amplifier, a second operational amplifier, a diode D1, a diode D2, a diode D3, and a diode D4, a resistor R1, a resistor R2, a resistor R3, a resistor R4, and a resistor R5, where one end of a capacitor C1 is connected to an input analog signal, another end of the capacitor C1 is connected to the resistor R1 and the resistor R4, another end of the resistor R1 is connected to a negative input end of the first operational amplifier, the anode of the diode D1 and one end of the resistor R3 are also connected to the negative input end of the first operational amplifier, one end of the resistor R2 is grounded, another end of the resistor R2 is connected to a positive input end of the first operational amplifier, an output end of the first operational amplifier is connected to the cathode of the diode D1 and the anode of the diode D2, another end of the resistor R3 and the cathode of the diode D2 are connected to a node N, another end of the resistor R4 is connected to a positive input end of the second operational amplifier, the anode of the diode D3 and one end of the resistor R5 are connected to a negative input end of the second operational amplifier, an output end of the second operational amplifier is connected to the cathode of the diode D3 and the anode of the diode D4, another end of the resistor R5 and the cathode of the diode D4 are connected to the node N, N is a rectified output node, the node N is connected to one end of a resistor R6, another end of the resistor R6 is connected to one end of a resistor R7 and one end of a capacitor C2, another end of the capacitor C2 is grounded, another end of the resistor R7 is connected to a positive input end of a third operational amplifier, a negative input end of the third operational amplifier is connected to an output end of the third operational amplifier and connected to a positive input end of a fourth operational amplifier, a negative input end of the fourth operational amplifier is connected to an output end of the fourth operational amplifier, thereby achieving a function of extracting envelope signal waveforms, and collection of a signal at the output end of the fourth operational amplifier results in extraction of a signal subjected to rectification, filtering, and envelope extraction; S2: performing amplitude extraction by extracting envelopes of the rectified voltage signals at the node N by using a resistor-capacitor (RC) low-pass filter composed of the resistor R6, the resistor R7, and the capacitor C2, where a relationship between a cutoff frequency fc of the RC low-pass filter and a resistance value R and a capacitance value C is $$f_c = \frac{1}{2\pi RC};$$

and S3: extracting the rectified amplitudes of the acoustic signals of the analog microphones by using the third operational amplifier and the fourth operational amplifier to construct a voltage follower to isolate a pre-stage circuit from a post-stage circuit.

Further, the non-magnetic signals are acoustic signals when the multiple detectors are digital microphones.

The digital microphones synchronously acquire the acoustic signals fed back by the inner wall of the pipeline and convert the acoustic signals into digital signals.

A main microcontroller and a sub-microcontroller synchronously acquire the digital signals converted by the digital microphones.

The main microcontroller acquires data from the accelerometer.

The pipeline curvature is calculated when the digital signals synchronously acquired by the main microcontroller and the sub-microcontroller reach the minimum value.

Further, the number of sub-microcontrollers is half the number of the digital microphones, and each of the sub-microcontroller is configured to collect digital signals acquired by two of the digital microphones.

Further, the non-magnetic signals are optical signals when the multiple detectors are optical proximity switches.

The optical proximity switches synchronously acquire the optical signals and convert the optical signals into distance signals.

The microcontroller acquires the distance signals collected by the optical proximity switches and calculates the pipeline curvature when the distance signals reach a minimum value.

The present invention has the following beneficial effects:

The solution provides a pipeline spanning or settlement bending detection device. The device includes a watertight spherical shell and multiple detectors. The watertight spherical shell rolls in a pipeline. The multiple detectors are circumferentially connected to the equator of the watertight spherical shell. For each detector, the detector is configured to acquire a non-magnetic signal fed back by the inner wall of a to-be-detected pipeline to determine the distance between the detector and the inner wall of the pipeline.

When the watertight spherical shell rolls on the inner wall of the pipeline, the detectors on the equatorial surface of the watertight spherical shell acquire acoustic signals or optical signals fed back by the inner wall of the pipeline. The method does not rely on magnetic signals when acquiring distance information and thus can detect the pipeline curvature of a pipeline wall made of any material.

BRIEF DESCRIPTION OF DRAWINGS

To illustrate the technical solutions in embodiments of the present invention or the technical solutions in the related art more clearly, drawings used in the description of embodiments or the related art are briefly described below. Apparently, the drawings described below illustrate part of the embodiments of the present invention, and those of ordinary skill in the art may obtain other drawings based on the drawings described below on the premise that no creative work is done.

REFERENCE LIST

Figure 1:
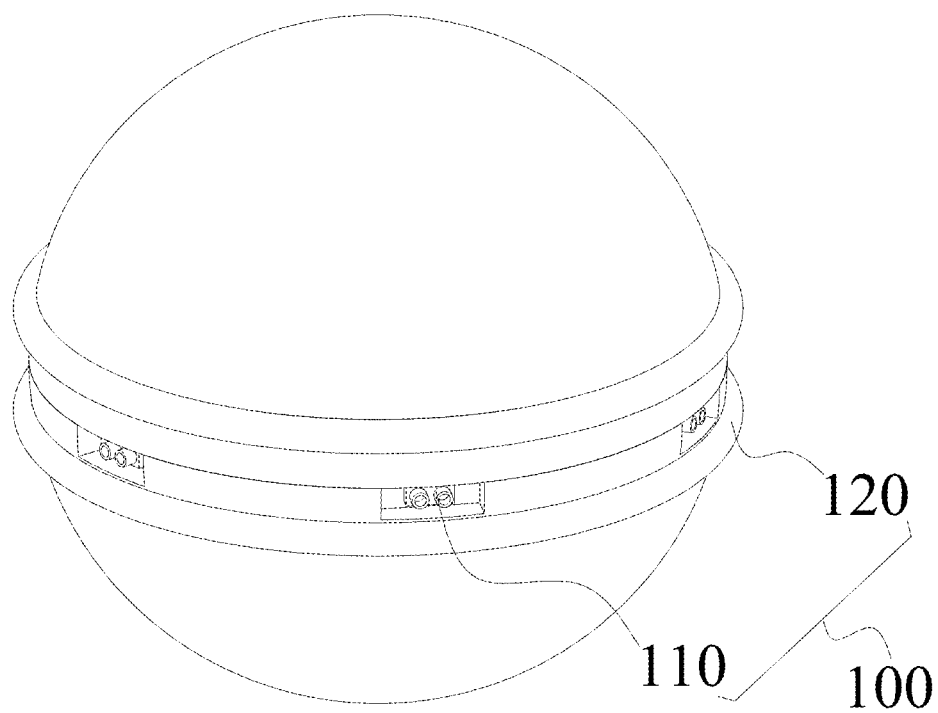
FIG. 1 is a view of the external structure of a watertight spherical shell according to the present invention.
Figure 2:
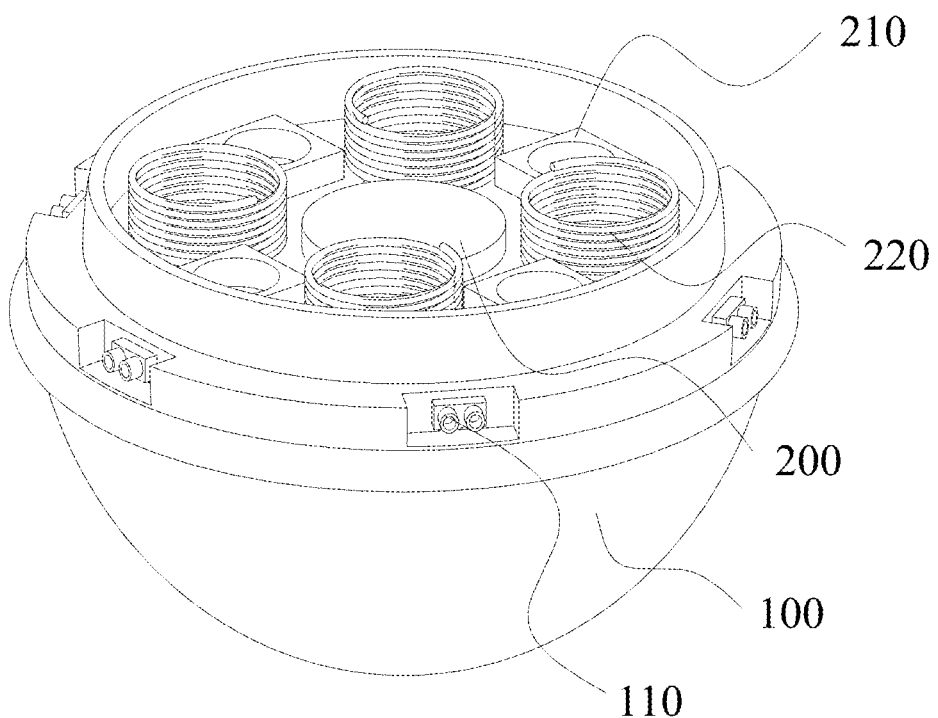
FIG. 2 is a view of the internal structure of a watertight spherical shell according to the present invention.

100, watertight spherical shell;
110, detector;
111, laser emitter;
112, laser receiver;
120, vibration-damping ring;
121, metal ring;
200, circuit board;
210, battery holder;
220, electromagnetic coil;
300, first operational amplifier;
400, second operational amplifier;
500, third operational amplifier;
600, fourth operational amplifier;
700, suspension frame;
710, suspension ball;
711, connecting rope;
720, magnet;
730, top rod;
740, rotary shaft.

DETAILED DESCRIPTION

The technical solutions of the present invention are described clearly and completely hereinafter in conjunction with drawings. Apparently, the described embodiments are part, not all, of embodiments of the present invention. Based on the embodiments of the present invention, all other embodiments obtained by those of ordinary skill in the art without creative work are within the scope of the present invention.

In the description of the present invention, it is to be noted that orientations or position relations indicated by terms such as "center", "upper", "lower", "left", "right", "vertical", "horizontal", "in" and "out" are based on the drawings. These orientations or position relations are intended only to facilitate and simplify the description of the present invention and not to indicate or imply that a device or element referred to must have such particular orientations or must be configured or operated in such particular orientations. Thus, these orientations or position relations are not to be construed as limiting the present invention. In addition, terms such as "first", "second" and "third" are used for the purpose of description and are not to be construed as indicating or implying relative importance.

In the description of the present invention, it is to be noted that unless otherwise expressly specified and limited, the term "mounted", "connected to each other", or "connected" should be construed in a broad sense, for example, as securely connected, detachably connected, or integrally connected; mechanically connected or electrically connected; directly connected to each other or indirectly connected to each other via an intermediary; or interconnected between two components. For those of ordinary skill in the art, specific meanings of the preceding terms in the present invention may be understood based on specific situations.

Embodiment One

As shown in FIGS. 1 to 8, an embodiment provides a pipeline spanning or settlement bending detection device. The device includes a watertight spherical shell 100 rolling inside a pipeline and multiple detectors 110 circumferentially connected to the equator of the watertight spherical shell 100. Each detector 110 is configured to acquire a non-magnetic signal fed back by the inner wall of the pipeline to determine the distance between the detector 110 and the inner wall of the pipeline.

The following describes the working mechanism of the detection device of this embodiment:

When the watertight spherical shell 100 rolls on the inner wall of the pipeline, the detectors 110 on the equatorial surface of the watertight spherical shell 100 acquire acoustic signals or optical signals fed back by the inner wall of the pipeline. The method does not rely on magnetic signals when acquiring distance information and thus can detect the pipeline curvature of a pipeline wall made of any material.

The following describes what non-magnetic signal is acquired and how to acquire such non-magnetic signal:

The detector 110 is an analog microphone, a digital microphone, or an optical proximity switch.

When the detector 110 is an analog microphone or a digital microphone, as the watertight spherical shell 100 rolls inside the pipeline, the analog microphone or the digital microphone acquires acoustic data fed back by the pipeline and determines the distance between the detector 110 and the inner wall of the pipeline based on the acoustic data. When the detector 110 is an optical proximity switch, as the watertight spherical shell 100 rolls inside the pipeline, the optical proximity switch emits laser to and receives laser from the inner wall of the pipeline and determines the distance between the detector 110 and the inner wall of the pipeline based on the laser reflection time.

The following describes how the watertight spherical shell 100 rolls around a fixed axis along the normal direction of the equatorial surface of the watertight spherical shell 100:

Mounted inside the watertight spherical shell 100 are a circuit board 200 connected to the middle of the equatorial surface of the watertight spherical shell 100; multiple battery holders 210 arranged in a circumferential array and electrically connected to the circuit board 200; and multiple electromagnetic coils 220 arranged in a circumferential array, electrically connected to the circuit board 200, and configured to transmit detection results to an external receiver. The watertight spherical shell 100 is counterweighted by the circuit board 200, battery holders 210, and electromagnetic coils 220, ensuring equal weight distribution on both sides of the equatorial surface, thereby enhancing the equatorial moment of inertia of the watertight spherical shell 100.

Two vibration-damping rings 120 are secured near the equatorial surface of the spherical inner detector, and heavy objects such as the electromagnetic coils 220 and the battery holders 210 are used for counterweight so that the weight on both sides of the equator of the watertight spherical shell 100 is equal. This allows the spherical inner detector to roll around a fixed axis in the pipeline along the equatorial surface, thereby providing strong disturbance resistance. Moreover, regardless of the final posture in which the spherical inner detector emits, the spherical inner detector rolls around a fixed axis along the equatorial normal direction, not affecting the final pipeline curvature detection result. The detection data emitted by the electromagnetic coils 220 to the external receiver represents the pipeline curvature detected by the detection device. The electromagnetic coils 220 are electrically connected to the battery holders 210 and thus can charge the batteries inside the battery holders 210, thereby powering components such as the microcontroller on the circuit board 200. The vibration-damping rings 120 are sleeved on both sides of the equator of the watertight spherical shell 100, reducing vibrations produced when the watertight spherical shell 100 rolls inside the pipeline, reducing the interference of vibrations on acquisition of acoustic signals and optical signals by the detectors, and ensuring that the counterweight of the watertight spherical shell 100 is balanced.

The following describes how to acquire the acceleration of the watertight spherical shell 100 rolling inside the pipeline:

A two-axis accelerometer is mounted at the center of the watertight spherical shell 100 and configured to collect an acceleration signal of the watertight spherical shell 100 rolling inside the pipeline.

The two-axis accelerometer is mounted at the center of the watertight spherical shell 100 to ensure the counterweight balance of the watertight spherical shell 100. When the watertight spherical shell 100 rolls inside the pipeline, the two-axis accelerometer detects the rolling acceleration of the shell. The data collection of distance information by the detector 110 and the collection of the acceleration signal by the two-axis accelerometer are performed synchronously. When the distance signal obtained by the detector 110 is at its minimum, the pipeline curvature can be determined by processing the current accelerometer data.

The following describes how to ensure the signal acquisition range of the detector 110:

Metal rings 121 are sleeved on the two sides of the equatorial surface of the watertight spherical shell 100. The vibration-damping rings 120 are sleeved in the metal rings 121. The metal rings 121 are in a clearance fit with the watertight spherical shell 100. A suspension frame 700 is rotatably connected to the outer wall of the watertight spherical shell 100. The suspension frame 700 includes a connecting rope 711 connected to the suspension frame 700; a suspension ball 710 connected to the connecting rope 711; two top rods 730 symmetrically connected to the upper part of the suspension frame 700; and two magnets 720 symmetrically connected to the lower part of the suspension frame 700. the suspension ball 710 floats in the liquid inside the pipeline and relies on buoyancy to pull the suspension frame 700 such that the top rods 730 are positioned at the upper part of the suspension frame 700 and the magnets 720 are positioned at the lower part of the suspension frame 700 so that the top rods 730 press upper parts of the metal rings 121 and the magnets 720 attract lower parts of the metal rings 121 so that the vibration-damping rings 120 on two sides of the multiple detectors 110 close to the inner wall of the pipeline move away from each other.

The suspension frame 700 is rotatably connected to the watertight spherical shell 100 via the rotary shaft 740. The axis of the rotary shaft 740 coincides with the axis of the rotating watertight spherical shell 100. The suspension ball 710 floats in the liquid inside the pipeline, providing an upward pulling force for the suspension frame 700. The magnets 720 provide a counterweight at the bottom of the suspension frame 700. This ensures that when the watertight spherical shell 100 rolls inside the pipeline, the top rods 730 on the suspension frame 700 remain at the upper part and the magnets 720 remain at the lower part. The magnets 720 at the lower part magnetically attract the metal rings 121 close to the inner wall of the pipeline so that when the watertight spherical shell 100 rolls, the vibration-damping rings 120 close to the inner wall of the pipeline move apart from each other, that is, the vibration-damping rings 120 on both sides of the detector 110 close to the inner wall of the pipeline move away from each other, ensuring that the signal acquired by the detector 110 is not obstructed by the vibration-damping rings 120.

An embodiment provides a pipeline spanning or settlement bending detection method using the pipeline spanning or settlement bending detection device.

The method includes that a microcontroller acquires non-magnetic signals collected by the multiple detectors 110 and the acceleration signal collected by the two-axis accelerometer and calculates pipeline curvature when the non-magnetic signals reach the extremum.

Calculating the pipeline curvature includes T1: synchronizing the non-magnetic signals collected by the multiple detectors 110 with the acceleration signal collected by the two-axis accelerometer; T2: calculating the time difference between X-axis and Y-axis accelerometer component time measured by the two-axis accelerometer when the non-magnetic signals acquired by the multiple detectors 110 reach the minimum value and X-axis and Y-axis accelerometer component extremum point or zero point time; T3: determining whether the direction is uphill or downhill by judging whether the time difference is positive or negative; T4: calculating the current pipeline curvature; and T5: summing curvature values corresponding to the multiple detectors 110 to obtain the current final curvature value.

The extremum of the non-magnetic signal correspond to the extremum of the distance signal. When the distance signal reaches the extremum, the accelerometer signal is synchronously collected and transmitted to the microcontroller, and the pipeline curvature is calculated. When the time difference is positive, the watertight spherical shell 100 is in an uphill state, and vice versa, it is in a downhill state. The pipeline curvature is calculated based on the phase change of the accelerometer data corresponding to the extremum point of the detector 110. The calculation algorithm is as follows: First, hardware synchronization ensures that the sampling data of the accelerometer and the sampling data of the multiple detectors 110 are collected synchronously. When the pipeline is in a horizontal state, the accelerometer rolls with the spherical inner detector 110, with the X-axis and Y-axis data being sine and cosine signals that are phase-constant and have a 90-degree phase difference. When the signal output of the detector 110 reaches the extremum, the corresponding accelerometer X-axis data is at an extremum point or zero point, and the Y-axis data is at a zero point or extremum point. When the pipeline has a bending angle θ, the accelerometer X-axis and Y-axis data corresponding to the extremum of the detector 110 output signal shows a time-series shift. This shift is correlated with the magnitude of the bending angle θ. The bending angle has a nonlinear continuous function relationship with this time shift. The two-axis accelerometer data corresponding to the minimum value of the detector 110 can be obtained through experimental calibration, and the current curvature can be obtained through interpolation.

Embodiment Two

Figure 9:
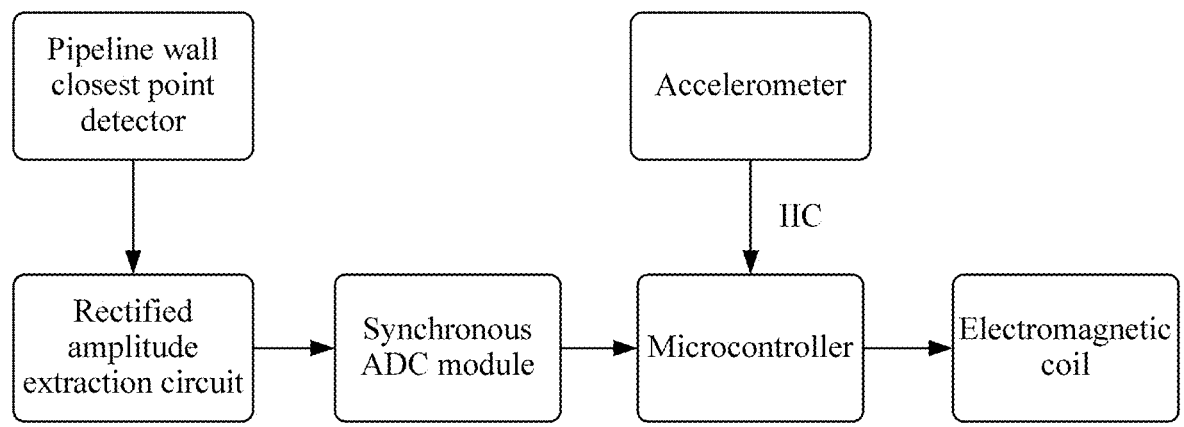
FIG. 9 is a diagram of an SD structure provided with an analog microphone array according to the present invention.
Figure 10:
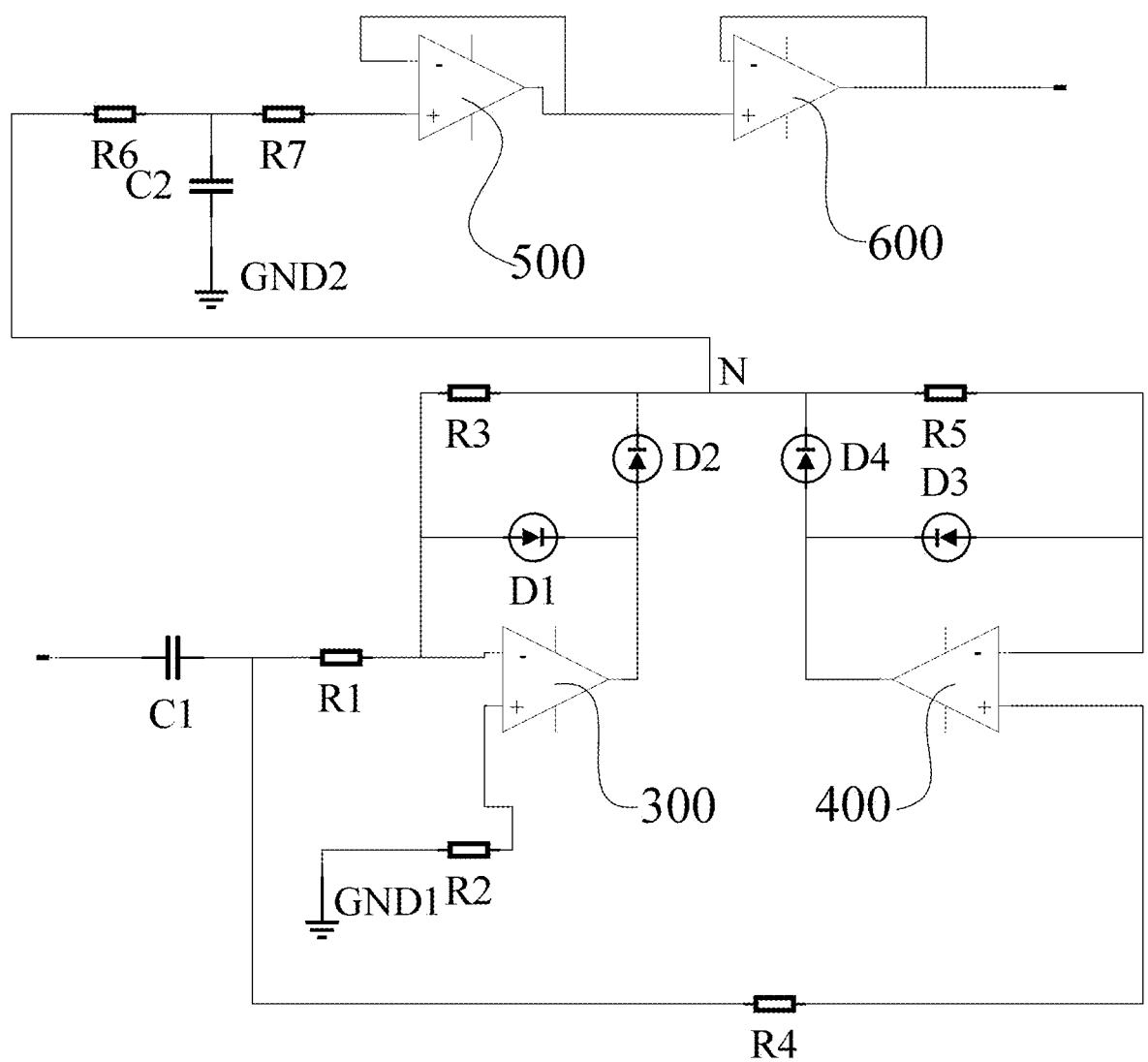
FIG. 10 is a circuit diagram of rectified amplitude extraction according to the present invention.
Figure 11:
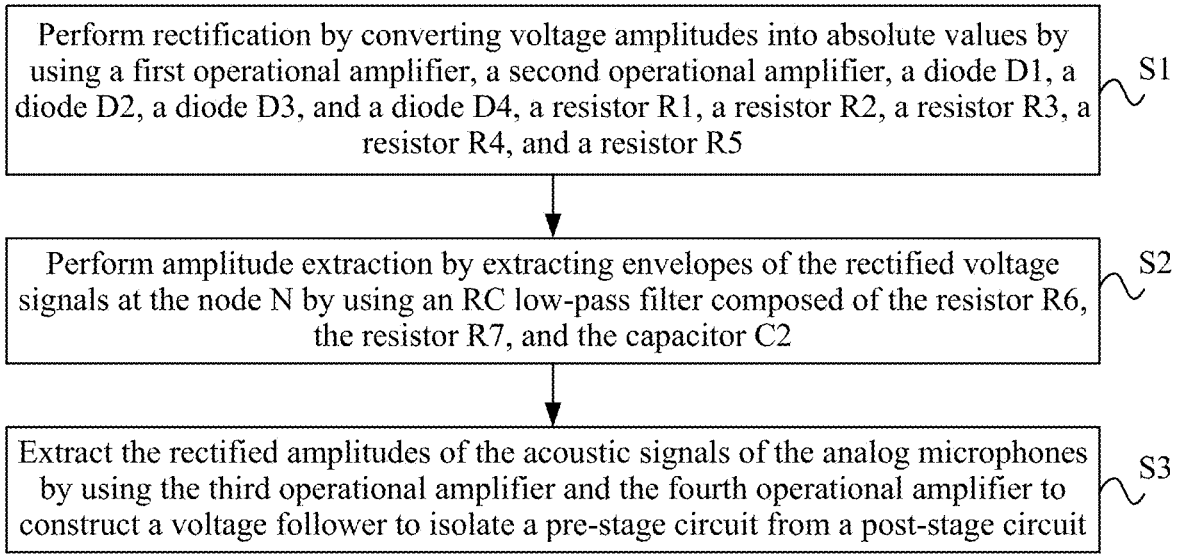
FIG. 11 is a flowchart of rectified amplitude extraction according to the present invention.

Referring to FIGS. 9 to 11, based on embodiment one, the following describes the detection method used when the detector 110 is an analog microphone:

The non-magnetic signals are acoustic signals. The analog microphones synchronously acquire the acoustic signals inside the pipeline. Among the analog microphones, when an analog microphone at the bottommost part of the equator of the watertight spherical shell 100 acquires an acoustic signal that reaches the minimum intensity when in contact with the inner wall of the pipeline, an analog microphone at the topmost part of the equator of the watertight spherical shell 100 acquires an acoustic signal that reaches the maximum intensity. Rectified amplitude extraction circuits corresponding to the analog microphones amplify voltage signals output by the analog microphones and transmit the voltage signals to a synchronous analog-to-digital converter (ADC) module. When the voltage signals reach the minimum value, the pipeline curvature is calculated.

The detector 110 uses an analog microphone array and multiple analog microphone units are placed in placement openings of the outer detector 110. Since the received signal is an acoustic signal, silicone gel is used to fill and secure the detector units to prevent sound attenuation interference from rigid adhesives that could weaken the signal strength of the detector 110. To prevent noise produced during rolling of the spherical inner detector from interfering with the detection result, two vibration-damping rings 120 are added near the equator of the spherical inner detector, greatly reducing the noise generated during the movement of the spherical inner detector in the pipeline and improving the calculation accuracy of the curvature. After the analog microphone array collects signals, they are rectified and filtered by a rectified amplitude extraction circuit, and then data from multiple microphones are collected via a synchronized ADC conversion channel. The voltage signals from the multiple microphones and the synchronized accelerometer data are transmitted to the microcontroller for curvature calculation. Multiple curvatures are calculated and averaged. This average value is then transmitted as the current data to the receiver via the electromagnetic coil 220.

Extracting rectified amplitudes includes S1: performing rectification by converting voltage amplitudes into absolute values by using a first operational amplifier 300, a second operational amplifier 400, a diode D1, a diode D2, a diode D3, and a diode D4, a resistor R1, a resistor R2, a resistor R3, a resistor R4, and a resistor R5, where one end of a capacitor C1 is connected to an input analog signal, another end of the capacitor C1 is connected to the resistor R1 and the resistor R4, another end of the resistor R1 is connected to a negative input end of the first operational amplifier 300, the anode of the diode D1 and one end of the resistor R3 are also connected to the negative input end of the first operational amplifier 300, one end of the resistor R2 is grounded, another end of the resistor R2 is connected to a positive input end of the first operational amplifier 300, an output end of the first operational amplifier 300 is connected to the cathode of the diode D1 and the anode of the diode D2, another end of the resistor R3 and the cathode of the diode D2 are connected to a node N, another end of the resistor R4 is connected to a positive input end of the second operational amplifier 400, the anode of the diode D3 and one end of the resistor R5 are connected to a negative input end of the second operational amplifier 400, an output end of the second operational amplifier 400 is connected to the cathode of the diode D3 and the anode of the diode D4, another end of the resistor R5 and the cathode of the diode D4 are connected to the node N, N is a rectified output node, the node N is connected to one end of a resistor R6, another end of the resistor R6 is connected to one end of a resistor R7 and one end of a capacitor C2, another end of the capacitor C2 is grounded, another end of the resistor R7 is connected to a positive input end of a third operational amplifier 500, a negative input end of the third operational amplifier 500 is connected to an output end of the third operational amplifier 500 and connected to a positive input end of a fourth operational amplifier 600, a negative input end of the fourth operational amplifier 600 is connected to an output end of the fourth operational amplifier 600, thereby achieving a function of extracting envelope signal waveforms, and collection of a signal at the output end of the fourth operational amplifier 600 results in extraction of a signal subjected to rectification, filtering, and envelope extraction; S2: performing amplitude extraction by extracting envelopes of the rectified voltage signals at the node N by using a resistor-capacitor (RC) low-pass filter composed of the resistor R6, the resistor R7, and the capacitor C2, where a relationship between a cutoff frequency fc of the RC low-pass filter and a resistance value R and a capacitance value C is $$f_c = \frac{1}{2\pi RC}$$

and S3: extracting the rectified amplitudes of the acoustic signals of the analog microphones by using the third operational amplifier 500 and the fourth operational amplifier 600 to construct a voltage follower to isolate a pre-stage circuit from a post-stage circuit.

The third operational amplifier 500 and the fourth operational amplifier 600 are used to construct a voltage follower to isolate a pre-stage circuit from a post-stage circuit. Since the integrated operational amplifiers have a high input impedance, they can better reduce the impact of the input resistance of the post-stage circuit on the amplitude extraction circuit, achieving the rectified amplitude extraction function for acoustic signals of the analog microphones. Finally, the rectified voltage signals are collected via the synchronized ADC conversion module. The multiple voltage signals, along with the synchronously collected accelerometer signals, are transmitted to the microcontroller for calculation of the pipeline curvatures. The pipeline curvatures are averaged as the final curvature. This final curvature is transmitted to the receiver via the electromagnetic coil 220.

Embodiment Three

Figure 12:
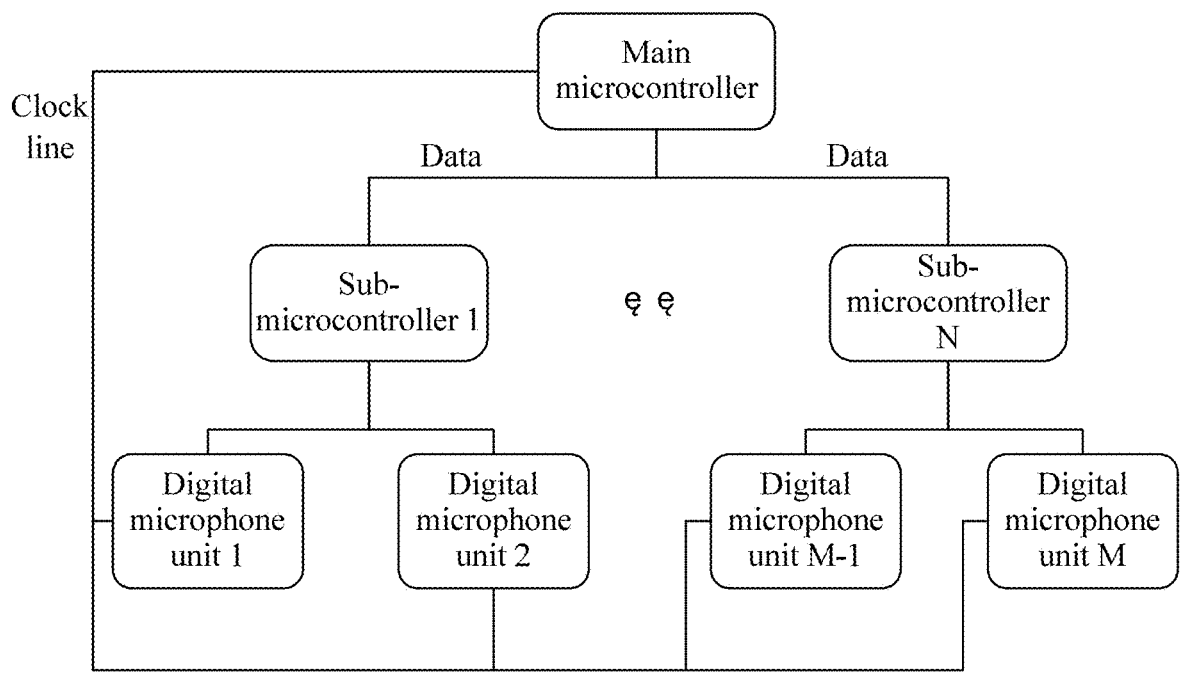
FIG. 12 is a diagram of a system architecture provided with a digital microphone array according to the present invention.

Referring to FIG. 12, based on embodiment one, the following describes the detection method used when the detector 110 is a digital microphone:

The non-magnetic signals are acoustic signals. The digital microphones synchronously acquire the acoustic signals fed back by the inner wall of the pipeline and convert the acoustic signals into digital signals. A main microcontroller and a sub-microcontroller synchronously acquire the digital signals converted by the digital microphones. The main microcontroller acquires data from the accelerometer. The pipeline curvature is calculated when the digital signals synchronously acquired by the main microcontroller and the sub-microcontroller reach a minimum value.

The analog microphone array is replaced with a digital microphone array. Correspondingly, the signal collection module also needs to be replaced. Due to the digital microphone array, there is no need for the analog circuit to perform rectified amplitude extraction. It is necessary to ensure the synchronization of the sampling of the multiple microphones. Therefore, a microcontroller sampling architecture as shown in FIG. 12 is used.

Preferably, the number of sub-microcontrollers is half the number of digital microphones, and each sub-microcontroller is configured to collect digital signals acquired from two digital microphones.

Due to the communication bus limitations of the digital microphones, in this embodiment, an SPI bus is used to simulate an IIS bus for the convenience of communication with the digital microphone array. In this embodiment, the microphone array detectors 110 are implemented with a number of channels corresponding to the number of digital microphones to improve the calculation accuracy of the curvature. Because of limited microcontroller resources, the microcontroller has only two SPI buses; therefore, the main microcontroller provides timing to the sub-microcontrollers. Each sub-microcontroller is responsible for signal collection from two digital microphone units to achieve synchronized sampling between multiple digital microphone units. After the sub-microcontrollers collect the current data, the sub-microcontrollers transmit the sampling data to the main microcontroller. The main microcontroller simultaneously collects accelerometer data. The values from multiple channels are substituted into the curvature calculation method of embodiment one before calculation. The values are averaged as the current curvature. The current curvature is transmitted in real time to the receiver via the electromagnetic coil 220. When the number of digital microphones in the array changes, the number of corresponding sub-microcontrollers also changes to achieve synchronized sampling of the digital microphone array.

Embodiment Four

Figure 3:
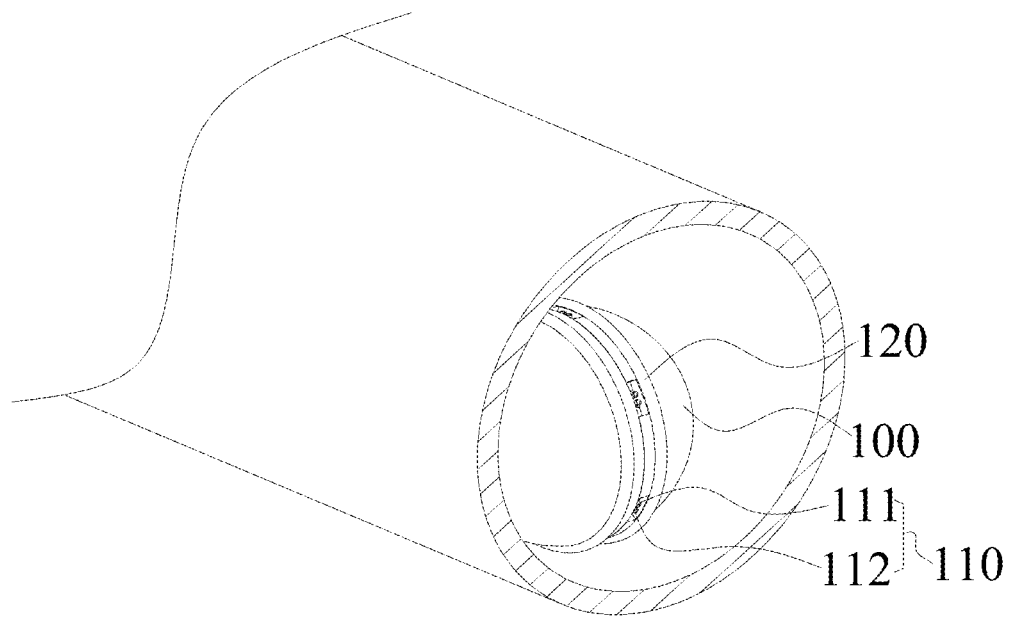
FIG. 3 is a view of a watertight spherical shell rolling in a to-be-detected pipeline according to the present invention.
Figure 4:
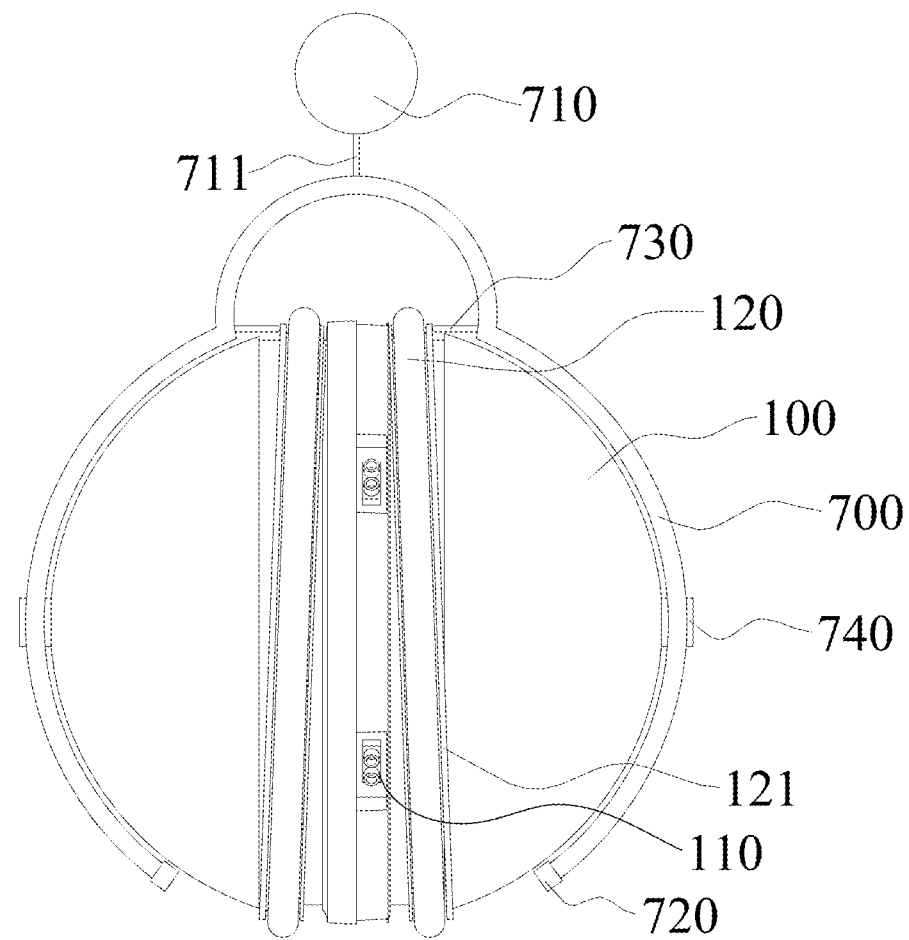
FIG. 4 is a front view of a watertight spherical shell having a suspension frame according to the present invention.
Figure 5:
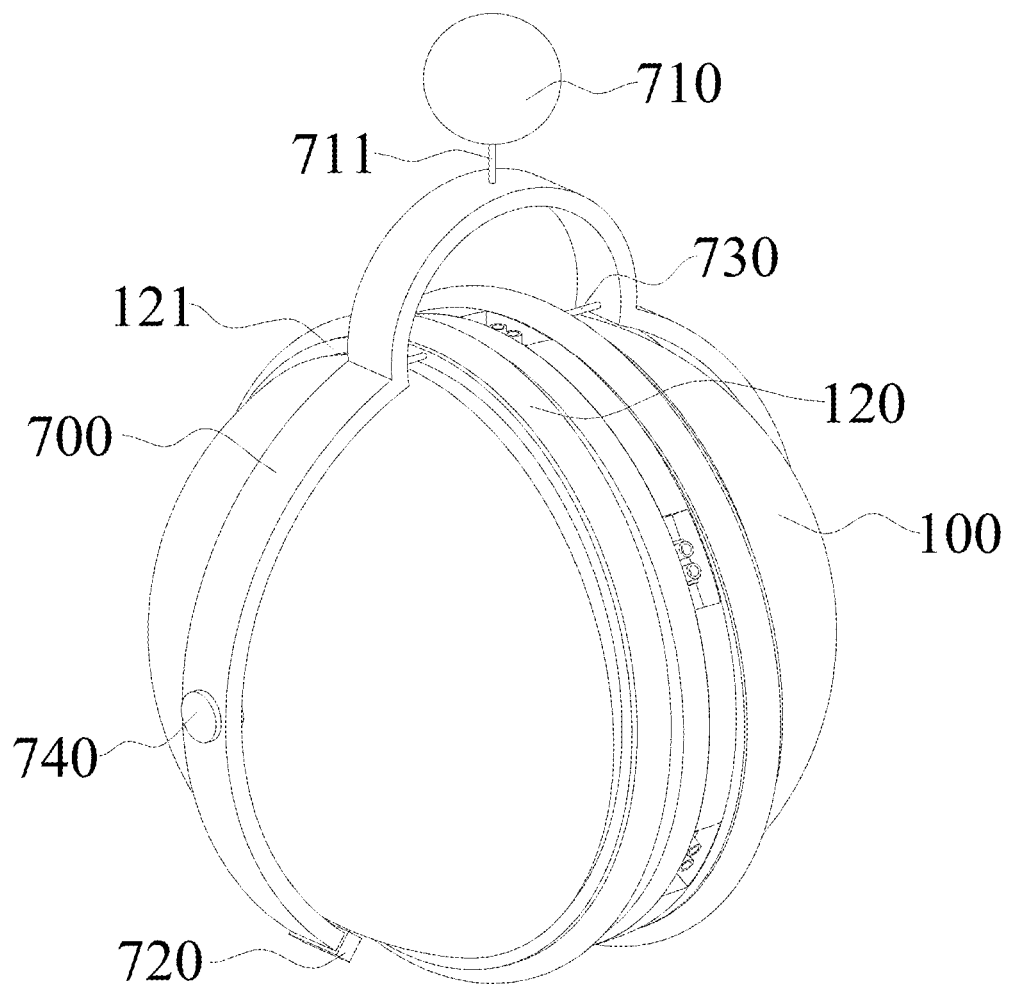
FIG. 5 is a perspective view of a watertight spherical shell having a suspension frame according to the present invention.
Figure 6:
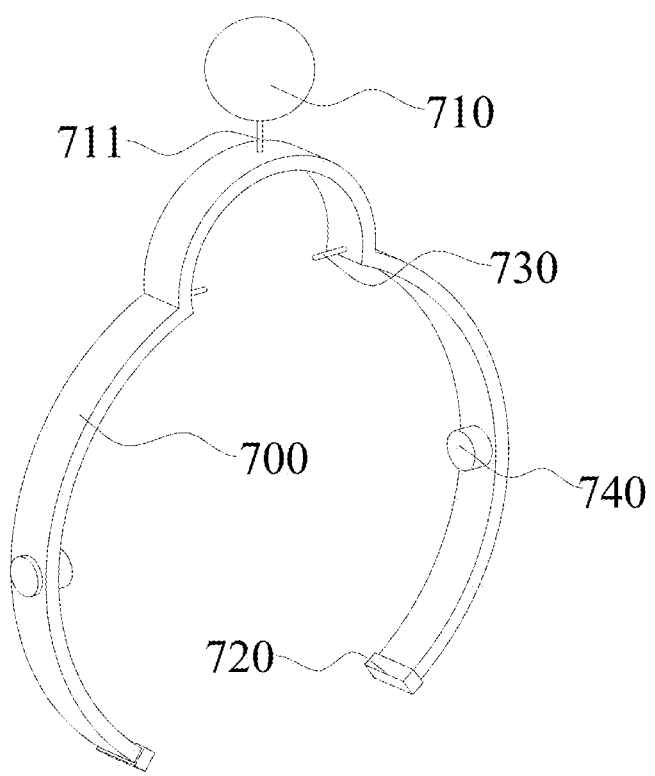
FIG. 6 is a structure view of a suspension frame according to the present invention.
Figure 7:
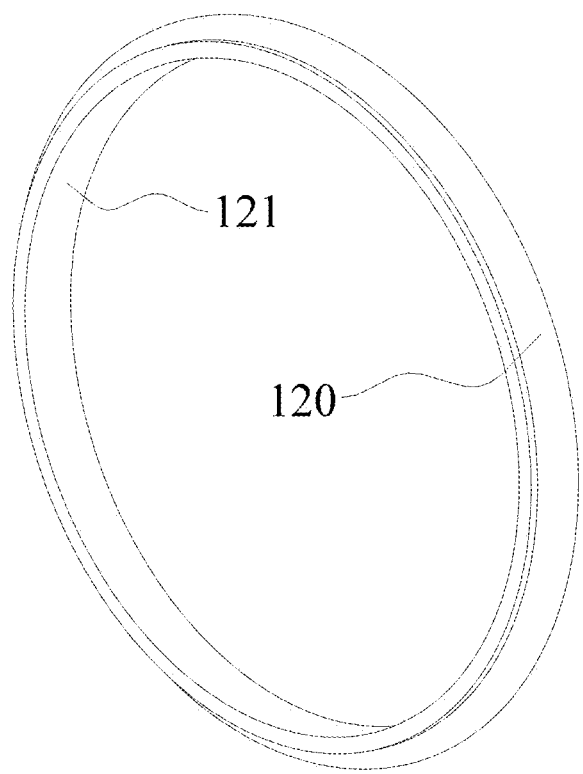
FIG. 7 is a view of vibration-damping rings sleeved in metal rings according to the present invention.
Figure 8:
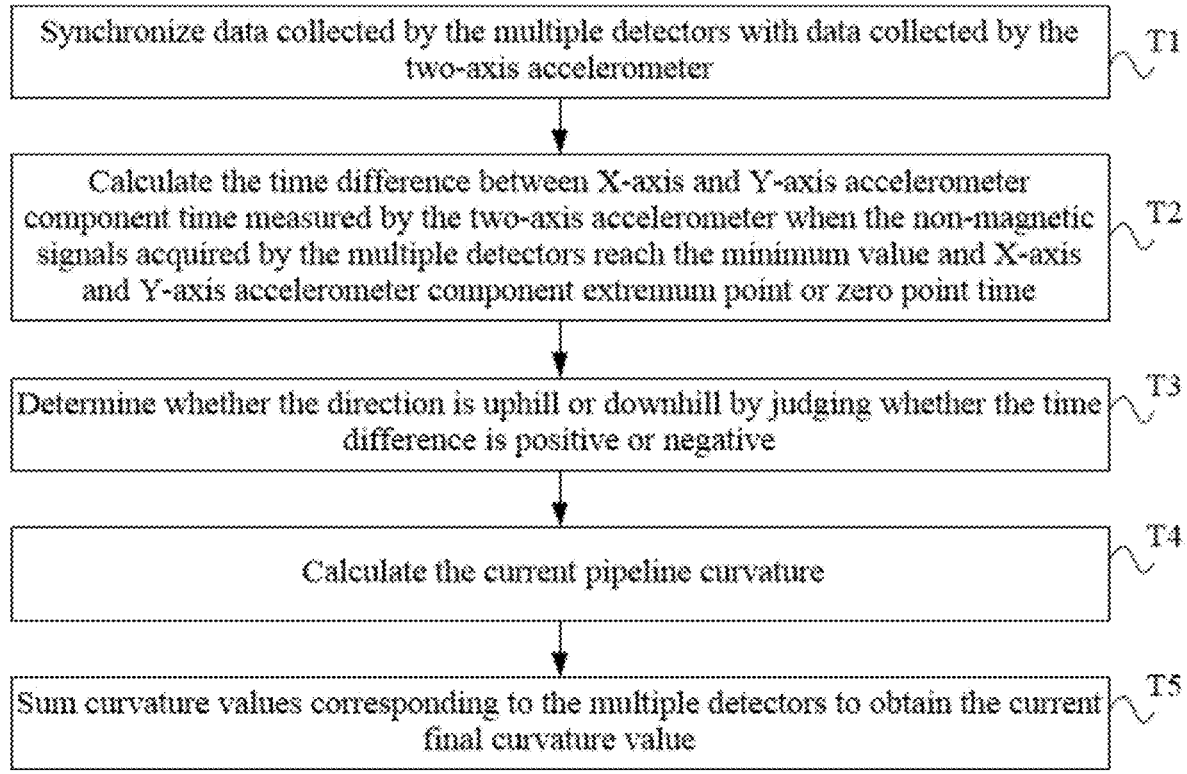
FIG. 8 is a flowchart of calculating pipeline curvature according to the present invention.

Referring to FIG. 3, based on embodiment one, the following describes the detection method used when the detector 110 is an optical proximity switch:

The non-magnetic signals are optical signals. The optical proximity switches synchronously acquire the optical signals and convert the optical signals into distance signals. The microcontroller acquires the distance signals collected by the optical proximity switches and calculates the pipeline curvature when the distance signals reach a minimum value.

Since the detector 110 used is an optoelectronic device and is sensitive to light, silicone cannot be used for securing. UV glue is used to replace silicone to secure the detector 110, ensuring that the reflected light is not affected. Since the optical proximity switch measures a relatively large distance, that is, the optical proximity switch has a larger lifting value, adding the damping rings 120 does not affect the accuracy of the curvature detection. Moreover, the addition of the damping rings 120 significantly reduces the impact of vibrations on the detection device, minimizing the distance measurement errors caused by vibrations in the optical proximity switch, and enhancing the detection accuracy.

The following describes the structure and working principle of the optical proximity switch:

The optical proximity switch includes a laser emitter 111 and a laser receiver 112. The laser emitter 111 emits laser towards the inner wall of the pipeline. The laser receiver 112 receives laser emitted by the laser emitter 111 and reflected from the inner wall of the pipeline.

The optical proximity switch continuously emits laser from the laser emitter 111, and the emitted laser is reflected by the inner wall of the pipeline and received by the laser receiver 112, thus obtaining the distance information between the optical proximity switch and the inner wall of the pipeline. In this embodiment, since the output signal is a digital signal, no rectification or amplitude extraction using an analog circuit is required. It is only necessary to ensure the synchronized sampling of multiple optical proximity switches. In this embodiment, the optical proximity switches are placed on the placement openings for holding the detectors along the equator, and the spherical inner detector moves steadily along the pipeline wall, so the distance information measured by the optical proximity switches continuously changes from the minimum value to the maximum value. When the distance information output reaches the minimum value, the pipeline curvature information can be calculated, with the calculation method being the same as that in embodiment one.

Finally, it should be noted that each of the above-mentioned embodiments is only used to describe the technical solution of the present invention, but not limited thereto. Although the present invention has been described in detail with reference to each of the above-mentioned embodiments, it should be understood by those skilled in the art that the technical solutions described in each of the above-mentioned embodiments may still be modified, or part or all of the technical features therein may be equivalently substituted. Such modifications or substitutions do not depart from the scope in nature of the technical solutions in each of the embodiments of the present invention.

What is claimed is:

1. A pipeline spanning or settlement bending detection device, comprising:
    a watertight spherical shell and a plurality of detectors, wherein the watertight spherical shell comprises:
        a circuit board connected to a middle of an equatorial surface of the watertight spherical shell;
        a plurality of battery holders arranged in a circumferential array and electrically connected to the circuit board;
        a plurality of electromagnetic coils arranged in a circumferential array, spaced apart from the plurality of battery holders, electrically connected to the circuit board, configured to transmit detection data and charge batteries in the plurality of battery holders; and two vibration-damping rings connected to outer walls on two sides of the equatorial surface of the watertight spherical shell;
        the plurality of detectors are circumferentially connected to an equator of the watertight spherical shell, and for each detector of the plurality of detectors, the detector is configured to acquire a non-magnetic signal fed back by an inner wall of a to-be-detected pipeline to determine a distance between the detector and the inner wall of the pipeline, wherein the non-magnetic signal is an acoustic signal or an optical signal,
    wherein metal rings are sleeved on the two sides of the equatorial surface of the watertight spherical shell, the vibration-damping rings are sleeved in the metal rings, and the metal rings are in a clearance fit with the watertight spherical shell; and
    a suspension frame is rotatably connected to an outer wall of the watertight spherical shell, and the suspension frame comprises:
        a connecting rope connected to the suspension frame;
        a suspension ball connected to the connecting rope;
        two top rods symmetrically connected to an upper part of the suspension frame; and two magnets symmetrically connected to a lower part of the suspension frame,
    wherein the suspension ball floats in a liquid inside the pipeline and relies on buoyancy to pull the suspension frame such that the top rods are positioned at the upper part of the suspension frame and the magnets are positioned at the lower part of the suspension frame so that the top rods press upper parts of the metal rings and the magnets attract lower parts of the metal rings so that the vibration-damping rings on two sides of the plurality of detectors close to the inner wall of the pipeline move away from each other.

2. The pipeline spanning or settlement bending detection device of claim 1, wherein the detector is an analog microphone, a digital microphone, or an optical proximity switch.

3. The pipeline spanning or settlement bending detection device of claim 1, wherein a two-axis accelerometer is mounted inside the watertight spherical shell and configured to collect an acceleration signal generated when the watertight spherical shell rolls.

4. A pipeline spanning or settlement bending detection method using the pipeline spanning or settlement bending detection device of claim 3, comprising:
    acquiring, by a microcontroller, non-magnetic signals collected by the plurality of detectors and the acceleration signal collected by the two-axis accelerometer; and
    calculating pipeline curvature when the non-magnetic signals reach an extremum, wherein calculating the pipeline curvature comprises:
    synchronizing the non-magnetic signals collected by the plurality of detectors with the acceleration signal collected by the two-axis accelerometer;
    calculating a time difference between X-axis and Y-axis accelerometer component time measured by the two-axis accelerometer when the non-magnetic signals acquired by the plurality of detectors reach a minimum value and X-axis and Y-axis accelerometer component extremum point or zero point time;
    determining whether a direction is uphill or downhill by judging whether the time difference is positive or negative;
    calculating current pipeline curvature; and
    summing curvature values corresponding to the plurality of detectors to obtain a current final curvature value.

5. The method of claim 4, wherein
    the non-magnetic signals are acoustic signals when the plurality of detectors are analog microphones;
    the analog microphones synchronously acquire the acoustic signals inside the pipeline;
    among the analog microphones, when an analog microphone at a bottommost part of the equator of the watertight spherical shell acquires an acoustic signal that reaches a minimum intensity when in contact with the inner wall of the pipeline, an analog microphone at a topmost part of the equator of the watertight spherical shell acquires an acoustic signal that reaches a maximum intensity;
    rectified amplitude extraction circuits corresponding to the analog microphones amplify voltage signals output by the analog microphones and transmit the voltage signals to a synchronous analog-to-digital converter (ADC) module; and
    when the voltage signals reach a minimum value, the pipeline curvature is calculated.

6. The method of claim 5, wherein extracting rectified amplitudes comprises:
    S1: performing rectification by converting voltage amplitudes into absolute values by using a first operational amplifier, a second operational amplifier, a diode D1, a diode D2, a diode D3, and a diode D4, a resistor R1, a resistor R2, a resistor R3, a resistor R4, and a resistor R5, wherein one end of a capacitor C1 is connected to an input analog signal, another end of the capacitor C1 is connected to the resistor R1 and the resistor R4, another end of the resistor R1 is connected to a negative input end of the first operational amplifier, the anode of the diode D1 and one end of the resistor R3 are also connected to the negative input end of the first operational amplifier, one end of the resistor R2 is grounded, another end of the resistor R2 is connected to a positive input end of the first operational amplifier, an output end of the first operational amplifier is connected to the cathode of the diode D1 and the anode of the diode D2, another end of the resistor R3 and the cathode of the diode D2 are connected to a node N, another end of the resistor R4 is connected to a positive input end of the second operational amplifier, the anode of the diode D3 and one end of the resistor R5 are connected to a negative input end of the second operational amplifier, an output end of the second operational amplifier is connected to the cathode of the diode D3 and the anode of the diode D4, another end of the resistor R5 and the cathode of the diode D4 are connected to the node N, N is a rectified output node, the node N is connected to one end of a resistor R6, another end of the resistor R6 is connected to one end of a resistor R7 and one end of a capacitor C2, another end of the capacitor C2 is grounded, another end of the resistor R7 is connected to a positive input end of a third operational amplifier, a negative input end of the third operational amplifier is connected to an output end of the third operational amplifier and connected to a positive input end of a fourth operational amplifier, a negative input end of the fourth operational amplifier is connected to an output end of the fourth operational amplifier, thereby achieving a function of extracting envelope signal waveforms, and collection of a signal at the output end of the fourth operational amplifier results in extraction of a signal subjected to rectification, filtering, and envelope extraction;

S2: performing amplitude extraction by extracting envelopes of the rectified voltage signals at the node N by using a resistor-capacitor (RC) low-pass filter composed of the resistor R6, the resistor R7, and the capacitor C2, wherein a relationship between a cutoff frequency fc of the RC low-pass filter and a resistance value R and a capacitance value C is $$f_c = \frac{1}{2\pi RC}$$

and

S3: extracting the rectified amplitudes of the acoustic signals of the analog microphones by using the third operational amplifier and the fourth operational amplifier to construct a voltage follower to isolate a pre-stage circuit from a post-stage circuit.

7. The method of claim 4, wherein
the non-magnetic signals are acoustic signals when the plurality of detectors are digital microphones;
the digital microphones synchronously acquire the acoustic signals fed back by the inner wall of the pipeline and convert the acoustic signals into digital signals;
a main microcontroller and a sub-microcontroller synchronously acquire the digital signals converted by the digital microphones;
the main microcontroller acquires data from the accelerometer; and
the pipeline curvature is calculated when the digital signals synchronously acquired by the main microcontroller and the sub-microcontroller reach a minimum value.

8. The method of claim 7, wherein a number of sub-microcontrollers is half a number of the digital microphones, and each of the sub-microcontroller is configured to collect digital signals acquired by two of the digital microphones.

9. The method of claim 4, wherein
the non-magnetic signals are optical signals when the plurality of detectors are optical proximity switches;
the optical proximity switches synchronously acquire the optical signals and convert the optical signals into distance signals; and
the microcontroller acquires the distance signals collected by the optical proximity switches and calculates the pipeline curvature when the distance signals reach a minimum value.

\* \* \* \* \*